Jan. 20, 1925.
J. H. MISKIMEN
VEHICLE WHEEL
Filed Oct. 11, 1920
1,523,442
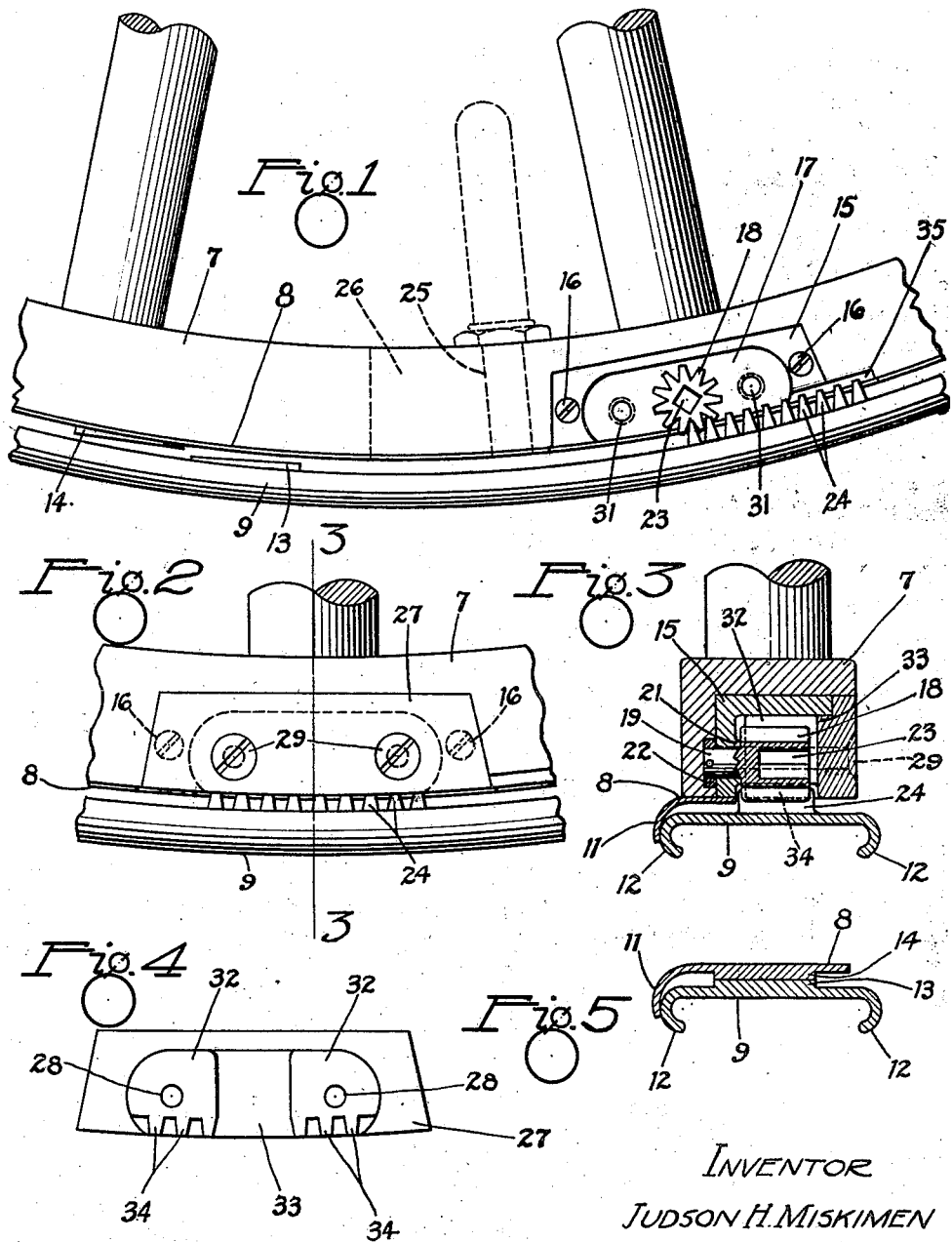
INVENTOR
JUDSON H. MISKIMEN
By Paul & Paul
HIS ATTORNEYS Patented Jan. 20, 1925.

1,523,442

UNITED STATES PATENT OFFICE.

JUDSON H. MISKIMEN, OF GLENDIVE, MONTANA.

VEHICLE WHEEL.

Application filed October 11, 1920. Serial No. 416,109.

*To all whom it may concern:*

Be it known that I, JUDSON H. MISKIMEN, a citizen of the United States, resident of Glendive, county of Dawson, State of Montana, have invented certain new and useful Improvements in Vehicle Wheels, and particularly improvements in that type of automobile wheel which employs a demountable rim, of which the following is a specification.

This improvement relates to vehicle wheels of the type employing demountable rims. It is old, so far as the inventor hereof is concerned, to employ cooperable pairs of wedge-like lugs provided at spaced intervals, one of each pair on the inner face of the demountable rim and the other of each pair on the fixed rim carried by the wheel body. These lugs co-operate through their inclined working surfaces to clamp the demountable rim to the wheel structure upon relative circumferential movement of the demountable rim and wheel.

This invention is particularly directed to the means for causing relative movement between the demountable rim and the wheel structure and for securing the demountable rim in locked position.

The object, therefore, of this invention, is to provide an improved vehicle wheel.

Other objects of the invention will more fully appear from the following description and the accompanying drawings and will be particularly pointed out in the annexed claims.

In the accompanying drawings there has been disclosed a structure designed to carry out the objects of the invention, but it is to be understood that the invention is not to be confined to the exact features shown as various changes may be made within the scope of the claims which follow.

In the drawings:

Figure 1 is a view in elevation of a portion of a wheel with this novel device applied thereto and showing the rim ready to be moved into clamped position;

Figure 2 is a fragmentary view similar to Figure 1 showing the rim in locked position;

Figure 3 is a section on the line 3—3 of Figure 2;

Figure 4 is a view in rear elevation of the locking plate; and

Figure 5 is a cross-sectional detail showing the rim and the wheel body lugs in clamped position.

In the embodiment of this invention here disclosed the vehicle wheel body 7 is shown as provided with the usual fixed rim 8 peripherally secured thereto and having a demountable rim 9 circumscribing the wheel body and adapted to be held against axial or transverse movement toward the vehicle body by means of the annular flange 11 preferably integral with the fixed rim 8. As is usual the pneumatic or other tire is adapted to be carried by the demountable rim 9 by means of its flanges 12.

Means are provided on the outer face of the wheel body or fixed rim 8 and on the inner face of the demountable rim 9 which are adapted, upon relative circumferential movement of the rim, to clamp or secure the rim to the body portion by frictional engagement.

As here shown the frictional clamping means consists of the usual lugs 13 carried by the inner face of the demountable rim, and the co-operating lugs 14 carried by the outer face of the fixed rim of the wheel body. These lugs are similar and are provided with reversely inclined co-operable working surfaces as shown in Figure 1. The surface inclination of each of the plurality of co-operable pairs of lugs, suitably disposed about the wheel body and rim, is such that, when the rim is moved to the left of the position shown in Figure 1, the rim will be radially and outwardly forced. This radial expansion of the rim is caused by the camming of the inner surface of a lug 13 over the substantially tangential surface of a lug 14.

Relative movement of the rim and wheel body is secured by means of serrated members affixed to the wheel body and to the demountable rim. The serrated member of the wheel body is preferably rotatable to engage the complementary serrated member of the demountable rim thereby to cause relative movement of the rim and wheel body. After the demountable rim has been moved to its lug-engaging working position, a locking element is adapted to be secured to the wheel body and to engage the serrated member of the positioned rim securely to hold the rim in locked working position.

In the embodiment of the invention here disclosed the wheel body is suitably recessed to receive a preferably metallic block 15 secured to the body by means of the screws 16. This block 15 is shaped to provide a recess 17 within which is positioned the rotatable serrated member such as a toothed wheel or spur 18 preferably integral with its shaft 19. The block 15 is substantially centrally apertured rotatably to receive therethrough the shaft 19. The block also is provided with an annular shoulder 21 to afford a bearing surface for the rotatable spur 18. The inner end of the shaft 19 is provided with a collar 22 pinned to the shaft, the collar being held, with a close running fit, in a recess formed in the wheel body. The spur is preferably formed with an axially extending recess 23 which is angular in cross-section so that the spur may be conveniently rotated by any suitable object such as a wrench or key inserted within the spur recess.

This spur is adapted to engage a toothed means carried by the demountable rim. Such means is here shown as a plurality of teeth 24 provided on the inner face of the demountable rim and preferably formed integrally therewith. For the purpose of indicating the desirable circumferential position of the teeth on the rim, there has been more or less informally indicated in Figure 1 the usual valve stem 25 of a pneumatic tire. As there indicated, these teeth 24 are provided on the demountable rim adjacent the customary aperture in such rim which is adapted to receive the usual tire valve stem. Furthermore, it may be here noted that, as is common in the art, the wheel body is provided with a circumferentially elongated slot 26 to receive and to permit circumferential movement of the valve stem 25 of a tire carried on the demountable rim, in accordance with standard practice, by the flanges 12.

These rim teeth 24 are shown in Figure 1 in position to be successively engaged by the teeth of the spur. Rotation of the spur causes relative circumferential movement of the demountable rim and wheel body whereby the rim may be moved to the left of the position shown in Figure 1. Such movement causes the working surface of the lug 13 to engage and cam over the working surface of the lug 14 so that the rim is substantially outwardly or radially forced so that the demountable rim assumes a substantially clamped frictional engagement with the wheel body. Reversal of rotation of the spur causes reverse relative travel of the rim to the wheel body to release position when the rim may be easily demounted from the wheel for the usual replacement or repair of the pneumatic tire.

After the spur 18 has been moved in a clockwise direction from its position shown in Figure 1, and the demountable rim has been thereby moved to its lug-engaging position, the locking element is employed to hold the rim against relative movement. This novel locking element is shown by Figure 4. It comprises a metallic plate 27 preferably large enough completely to cover the block 15. This plate has a pair of apertures 28 to receive the screws 29 which project beyond the plate and are received in threaded engagement in the threaded apertures 31 in the block 15 whereby the plate 27 may be securely held in position on the block. The plate 27 is provided with two integral built-up portions or shoulders 32. These shoulders are built up higher than, and are oppositely disposed about, a central raised portion 33.

As shown in section in Figure 3, this central portion 33 is relatively only slightly raised in comparison with the shoulders 32. When the plate is in position on the block 15, the central portion 33 extends within the block recess and is adjacent but preferably out of contact with the spur 18, while the two projecting shoulders inwardly extend on either side and likewise out of contact with the spur.

Teeth 34 are integrally provided on the two shoulders and are adapted to mesh with the demountable rim teeth 24 which are adjacently presented when the rim is moved to working position. As here shown three teeth are provided on each shoulder 32.

The wheel body 7 and the fixed rim 8 are preferably provided with a circumferentially elongated recess 35 adjacent the block 15 in order to accommodate the rim teeth 24 during the initial positioning of the demountable rim and to permit circumferential movement thereof into and out of locking position.

Having thus described my invention, what I claim as new and desire to secure by Letters Patent is:

1. A wheel including a wheel body having a recess therein and a demountable rim, co-operable lugs upon the rim and body adapted upon circumferential movement of the rim to clamp the rim on the body, serrated means within the recess on the rim, a member rotatably mounted on the wheel body and adapted to engage the serrated means to move the rim into clamping position, and locking means adapted to be secured to said body within the recess to engage said serrated means when the rim is in clamping position whereby the rim is locked on the wheel body.

2. A wheel including a wheel body having a recess therein and a demountable rim therefor, co-operable lugs upon the rim and body adapted upon circumferential movement of the rim to clamp the rim on the body, serrated means on the rim within the recess, a member rotatably mounted in the recess in the wheel body to engage the serrated means to move the rim into clamping position, and a locking element adapted to be secured to said body within the recess, locking means on said element to project within the recess on each side of said rotatable member to engage said serrated means when the rim is in clamping position whereby the rim is locked on the wheel body.

3. A wheel including a wheel body having a recess therein and a demountable rim therefor, co-operable lugs upon the rim and body adapted upon circumferential movement of the rim to clamp the rim on the body, serrated means on the rim, a spur rotatably mounted in the recess in the wheel body to engage said serrated means to move the rim into clamping position, a plate adapted to be secured to the wheel body to cover said recess, serrated means on said plate to project within the recess on each side of the spur to engage said rim serrations when the rim is in clamping position whereby the rim is locked on the wheel body.

4. A wheel including a wheel body having a recess therein and a demountable rim therefor, co-operable lugs upon the rim and body adapted upon circumferential movement of the rim to clamp the rim on the body, serrated means on the rim, a spur rotatably mounted in the recess in the wheel body to engage said serrated means to move the rim into clamping position, a plate adapted to be secured to the wheel body to cover said recess, opposed shoulders on one face of said plate adapted to project within the recess on each side of the spur, and serrations on each shoulder to engage the rim serrations when the rim is in clamping position whereby the rim is locked on the wheel body.

5. A wheel including a wheel body having a recess therein and a demountable rim for the wheel, serrated means on the periphery of the rim, a rotatable member mounted permanently in the recess in the wheel body to mesh with the serrated means to move the rim circumferentially, an element adapted to be secured to said body within the recess and having locking means on the element to project within the recess on each side of said permanently mounted rotatable member to engage said serrated means when the rim is in one position to hold the rim from movement relative to the wheel body.

In witness whereof, I have hereunto set my hand this 22nd day of September, 1920.

JUDSON H. MISKIMEN.